A. L. HITCHCOCK.
TROLLEY WHEEL GUARD.
APPLICATION FILED APR. 7, 1920.
1,376,204.
Patented Apr. 26, 1921.
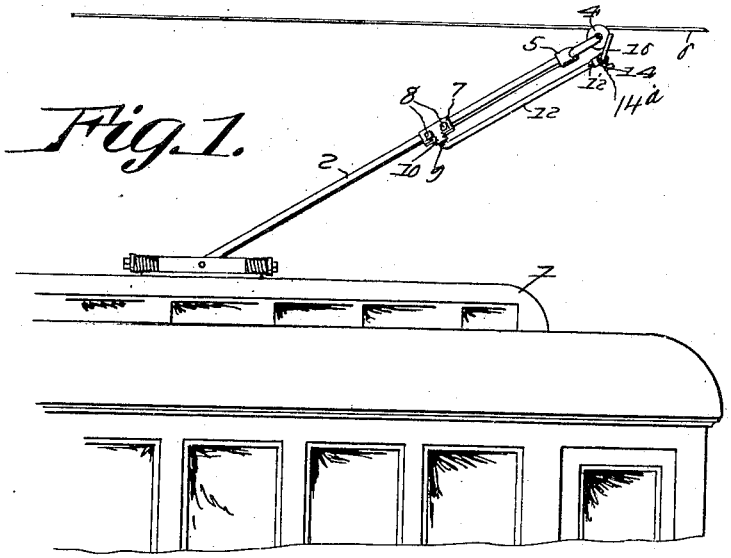
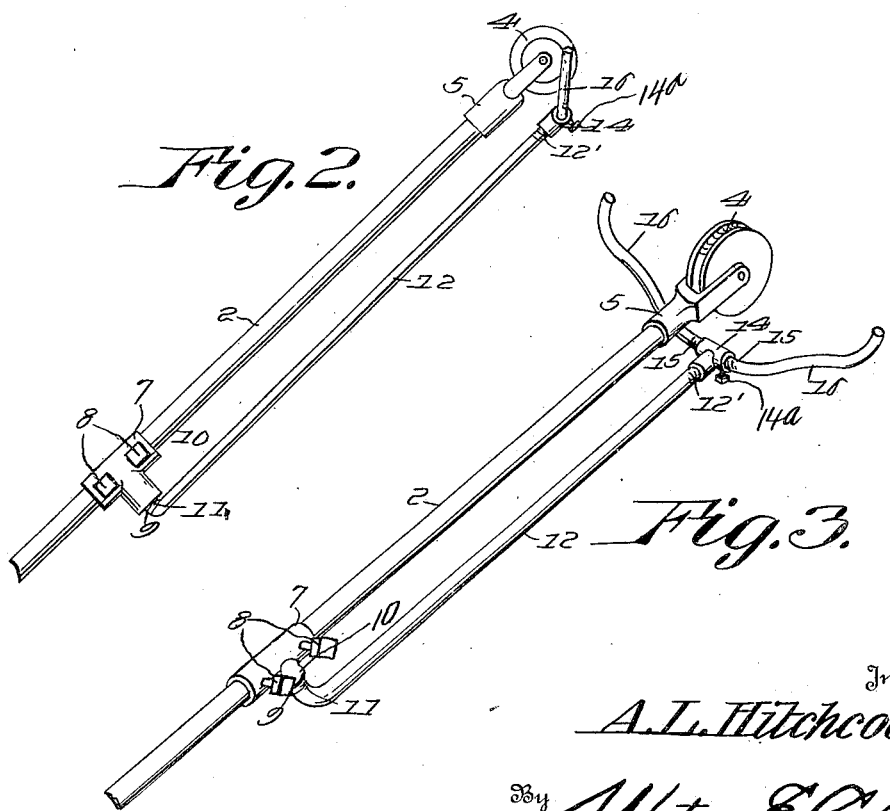
Inventor
A. L. Hitchcock,
By Watson E. Coleman
Attorney ic
UNITED STATES PATENT OFFICE.

AMOS L. HITCHCOCK, OF CARRABELLE, FLORIDA.

TROLLEY-WHEEL GUARD.

1,376,204.  Specification of Letters Patent.  Patented Apr. 26, 1921.

Application filed April 7, 1920. Serial No. 372,009.

*To all whom it may concern:*

Be it known that I, AMOS L. HITCHCOCK, a citizen of the United States, residing at Carrabelle, in the county of Franklin and State of Florida, have invented certain new and useful Improvements in Trolley-Wheel Guards, of which the following is a specification, reference being had to the accompanying drawings.

This invention relates to an improved trolley wheel guard, and an object is to provide a device of this kind acting to prevent the trolley pole from rising to a point where it will damage the trolley wire or span or hanger wires, in case the trolley wheel leaves or jumps the wire.

A further object is to provide a trolley of this kind including a yieldable bracket arm adjustable in a plane substantially parallel with the trolley pole and provided with guard arms extending laterally and curved upwardly and partly toward the wire so that should the trolley wheel leave or jump the trolley wire, the guard arms will be engaged by the wire, thereby preventing the trolley pole from rising to a point where it would otherwise damage the trolley wires or span or hanger wires.

A still further object of the invention is to provide guard arms which are capable of being bent or curved in different positions relatively to the trolley pole and wire so as to coöperate with different constructions of trolley wires.

A further object embodies the provision of a bracket arm including a sleeve adjustable on the trolley pole, whereby the bracket arm is capable of adjustment in a plane parallel with the pole, said bracket arm having a transversely disposed sleeve at its terminal for the reception of detachable guard arms, which are laterally disposed and curved as aforesaid.

Furthermore, the guard arms are capable of adjustment rotatively so as to dispose the curved parts of the arms in different relative positions to the trolley wire.

A still further object is the provision of a device of this kind which is simple, efficient and practical in construction and can be very cheaply manufactured and installed upon trolley systems at a reasonable profit.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation showing a conventional construction of the upper part of a trolley car with the trolley pole thereon including the trolley wheel engaging a trolley wire and showing the trolley guard as applied.

Fig. 2 is an enlarged side elevation of the trolley pole and wheel and wire showing the guard as applied, illustrating the arrangement of the guard arms, and Fig. 3 is an enlarged detail perspective view of a portion of the trolley pole and wheel showing the guard attached thereto.

Referring more especially to the drawings, 1 designates the upper part of a trolley car showing a conventional form of trolley pole 2 connected to the car in the usual manner. The upper end of the pole carries a trolley wheel 4 mounted in the trolley head 5 and adapted to engage the trolley wire 6.

Secured upon the trolley pole 2 by means of the set bolts or screws 8 is a T sleeve 7. This sleeve 7 is capable of adjustment longitudinally upon the pole and threaded at 9 into the leg 10 of the T sleeve is the right angle end 11 of the yieldable bracket arm 12. The bracket arm 12 assumes practically a position in a plane parallel with the pole and is capable of slight yieldable movements. It is obvious that when the T sleeve is adjusted, the bracket arm 12 is adjusted relatively to the wire and the trolley wheel.

The upper end of the bracket arm has connected thereto by means of threads 12, a second T sleeve 14. This second T sleeve 14 is capable of adjustments rotative relatively to the bracket arm. It will be noted that the bracket arm threads into the leg of the second T sleeve 14 and threaded at 15 into the lateral parts of the T sleeve are guard arms 16. These guard arms extend laterally and upwardly in opposite directions and are curved as shown extending partly toward the trolley wire as shown clearly in the drawings, so that should the trolley wire leave the wheel or the wheel jump the wire, the trolley pole is prevented from rising to a point where it would damage the trolley wire or span or hanger wires.

Furthermore by means of these guard arms, an operator is capable of readily restoring the trolley wheel in engagement with the trolley wire owing to when the wire leaves the wheel it will strike one or the other of the arms, and become disposed at a point substantially below the wheel, so that the operator may by pulling down upon the pole move it in a plane so that when the wheel is far enough down and the pole allowed to spring up again, the wheel will engage the wire. Furthermore, the guard arms are capable of adjustments relatively so as to dispose the upwardly and laterally curved parts of the arms in different relative positions to the wire. As previously stated, the guard arms are capable of being bent to different positions relatively to the wire.

Set bolts 14ᵃ engage through the T 14 from the under side thereof in order to hold the arms 10 in position, and to prevent the arms from turning after once being set.

The invention having been set forth, what is claimed as new and useful is:—

1. The combination with a trolley pole including a trolley wheel operatively mounted in the head thereof, of a bracket arm on the trolley pole positioned in a plane substantially parallel thereto, the upper end of the bracket arm having guard arms extending laterally, upwardly and curved partly toward the wire either one of which adapted to be engaged by the wire when it leaves the wheel, thereby preventing the trolley pole from rising to a point where it would damage the trolley or span wires, said guard arms being adjustable rotatively so as to dispose the laterally, upwardly and curved parts in different positions relatively to the trolley wire.

2. The combination with a trolley pole including a trolley wheel operatively mounted in the head thereof, of a T sleeve adjustable on the trolley pole, a bracket arm rotatively adjustable in the leg of the T sleeve, a second T sleeve having its leg adjustably connected to the upper end of the bracket arm rotatively, guard arms adjustable in the lateral parts of the second T sleeve and extending laterally, upwardly and curved partly toward the trolley wire to be engaged by the trolley wire when it leaves the wheel, thereby preventing the pole from rising to a point where it would damage the trolley or span wires.

3. In a device as set forth, a trolley pole including a trolley wheel operatively mounted on the head thereof, an arm positioned under and in parallelism with the trolley pole with one end attached to the pole and having its other end terminating adjacent the trolley head, the arm being free and movable relatively to the pole, guard arms extending laterally, upwardly and curved partly toward the wire, either one of which being adapted to be engaged by the wire when it leaves the wheel, thereby preventing the trolley pole from rising to a point where it would damage the trolley or span wires, and means for connecting the guard arms to the upper end of the first arm adjustably and rotatably, so that the guard arms may be adjusted on an axis at right angles to the trolley wire.

In testimony whereof I hereunto affix my signature.

AMOS L. HITCHCOCK.